Feb. 14, 1967 A. A. PEGON 3,303,536
PROCESS AND APPARATUS FOR AUTOMATICALLY PRODUCING AND
ASSEMBLING FOUNDRY MOLDS
Filed April 16, 1965 14 Sheets-Sheet 1

INVENTOR.
*Alexander A. Pegon,*
BY
*Paul & Paul*
ATTORNEYS.

Feb. 14, 1967

A. A. PEGON 3,303,536

PROCESS AND APPARATUS FOR AUTOMATICALLY PRODUCING AND ASSEMBLING FOUNDRY MOLDS

Filed April 16, 1965

FIG_7_
MOLDING MACHINE

INVENTOR.
Alexander A. Pegon,
BY
Paul & Paul
ATTORNEYS.

United States Patent Office 3,303,536
Patented Feb. 14, 1967

1

3,303,536
PROCESS AND APPARATUS FOR AUTOMATICALLY PRODUCING AND ASSEMBLING FOUNDRY MOLDS
Alexander A. Pegon, Norristown, Pa., assignor to Turbo Machine Company, Lansdale, Pa., a corporation of Pennsylvania
Filed Apr. 16, 1965, Ser. No. 448,823
8 Claims. (Cl. 22—20)

This invention relates to a process and apparatus for automatically and continuously producing and assembling foundry molds of high quality.

The prior apparatus and processes for producing foundry molds often required extensive manual handling of the molds during the various stages of production. The apparatus required extensive layouts with tiered conveyors introducing mold forming materials and cope and drag flasks at various points along the production line. The standard prior processes were inefficient, relatively slow, required close supervision and often joined the matching mold halves inaccurately.

The series of process steps and the components of the apparatus of this invention operate along a generally one level conveyor system wherein pairs of empty cope and drag flasks are introduced at one end and completely closed or joined half molds are delivered at the opposite end ready for metal pouring. This system is efficient and is constructed as disclosed herein to run fully automatically with only a minimum of supervisory attention.

In the form of the invention disclosed herein, two complementary matching half patterns are employed to form two impressions which when subsequently joined form a single closed mold, but it should be noted that duplicate patterns can be used thereby producing twice as many molds if so desired.

It is, therefore, the object of this invention to provide a novel apparatus and method which forms and assembles foundry casting molds automatically, continuously and with great accuracy.

Further advantages of this invention, in addition to those indicated above, will become more apparent from the description set forth hereinbelow and as shown in the attached drawings, wherein:

2

Although the apparatus and method of this invention are described in particular detail herein, it should be understood that this represents only the preferred form of the invention and that various alterations and modifications can be included therein without departing from the essential teaching of the invention.

The preferred process for perfecting and joining molds by this invention comprises the steps of arranging cope and drag flasks alternately for intermittent introduction into a molding machine, placing the flasks on a pattern plate, filling the flasks with sand or other finely divided material around a pair of complementary pattern halves, compressing the sand so that an impression is formed and retained in each flask when the pattern is separated from the flasks, turning over the drag and then placing the cope in alignment on top of the drag thereby assembling the complete mold.

Figure 1:
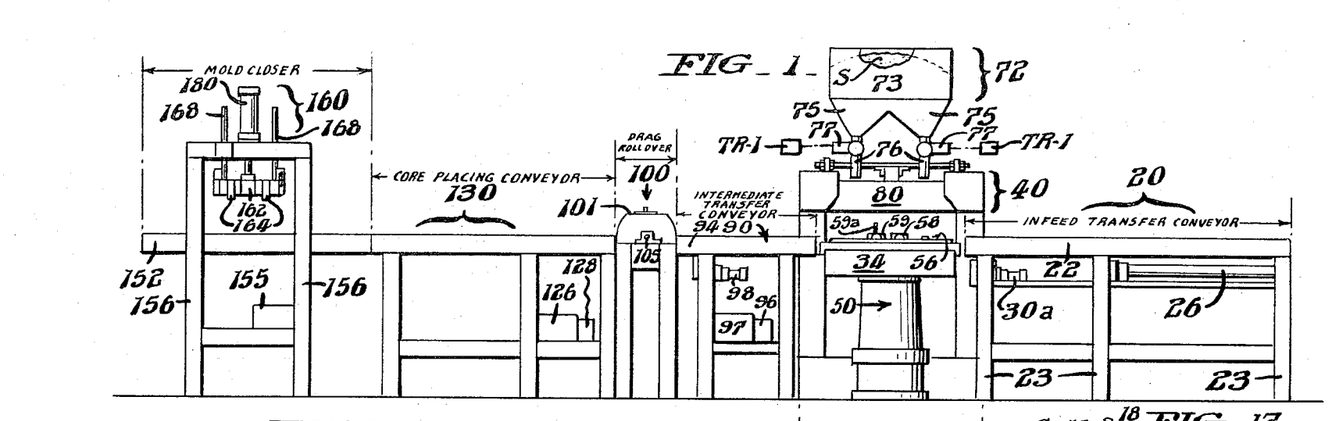
FIG. 1 is a simplified view in side elevation of the preferred form of the apparatus of this invention.

The preferred apparatus for accomplishing the aforedescribed process is shown in FIG. 1 and comprises components which can be generally described as an infeed transfer conveyor, a molding machine, an intermediate transfer conveyor, a drag rollover, a core placing conveyor and a mold closer. To more fully illustrate the apparatus and process of this invention, the flasks shown in FIGS. 17 through 21 indicate the different stages of the mold-forming process.

Figures 17, 18, 19, 20, 21:
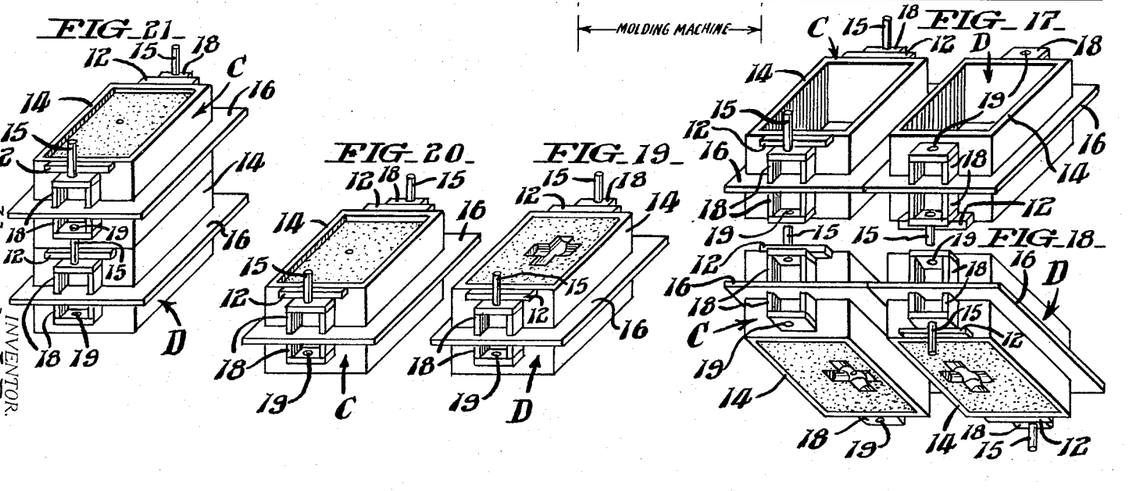
FIGS. 17 through 21 are perspective views of pairs of cope and drag flasks as they appear at various stages in the process and apparatus of this invention.

The preferred form of flasks for use in this invention are the drag flask D and the cope flask C shown in FIG. 17, the flasks being identical in structure but the drag being fed into the apparatus initially in the inverted position shown. Both the drag and the cope have generally a rectangular, body 14 with an open bottom and top and a peripheral flange 16 which completely surrounds the body 14. Both the drag and the cope have box-like structures 18 located at the ends of the bodies 14, each of which includes a hole 19, a stud 15 and a flange 12.

Figure 3:
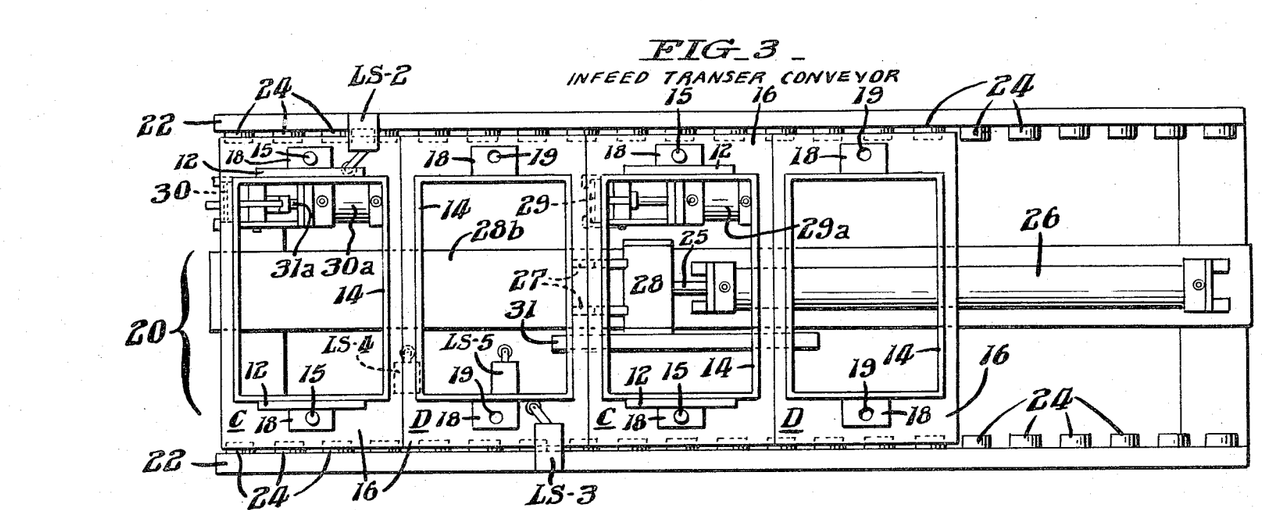
FIG. 3 is a top view of the apparatus shown in FIG. 2.
Figure 4:
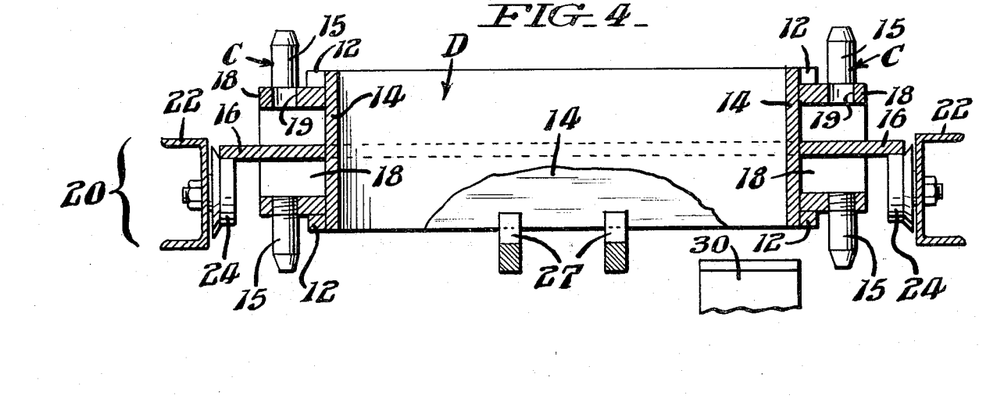
FIG. 4 is a sectional view taken along the lines and arrows IV—IV of FIG. 2.

The flasks are placed on an infeed transfer conveyor, generally designated by the numeral 20 (FIGS. 1–4), so that the cope and drag alternate, this invention being designed to accommodate a series of pairs of cope and drag flasks during the various operations. The conveyor 20 includes a series of rollers 24 mounted in opposing sets for free rotation on parallel members 22 supported along their length by members 23. The cope and drag are supported by the rollers 24 beneath flanges 16 of the flasks as shown in FIG. 4, and move on the conveyor in the direction of the arrow in FIG. 2.

Figure 2:
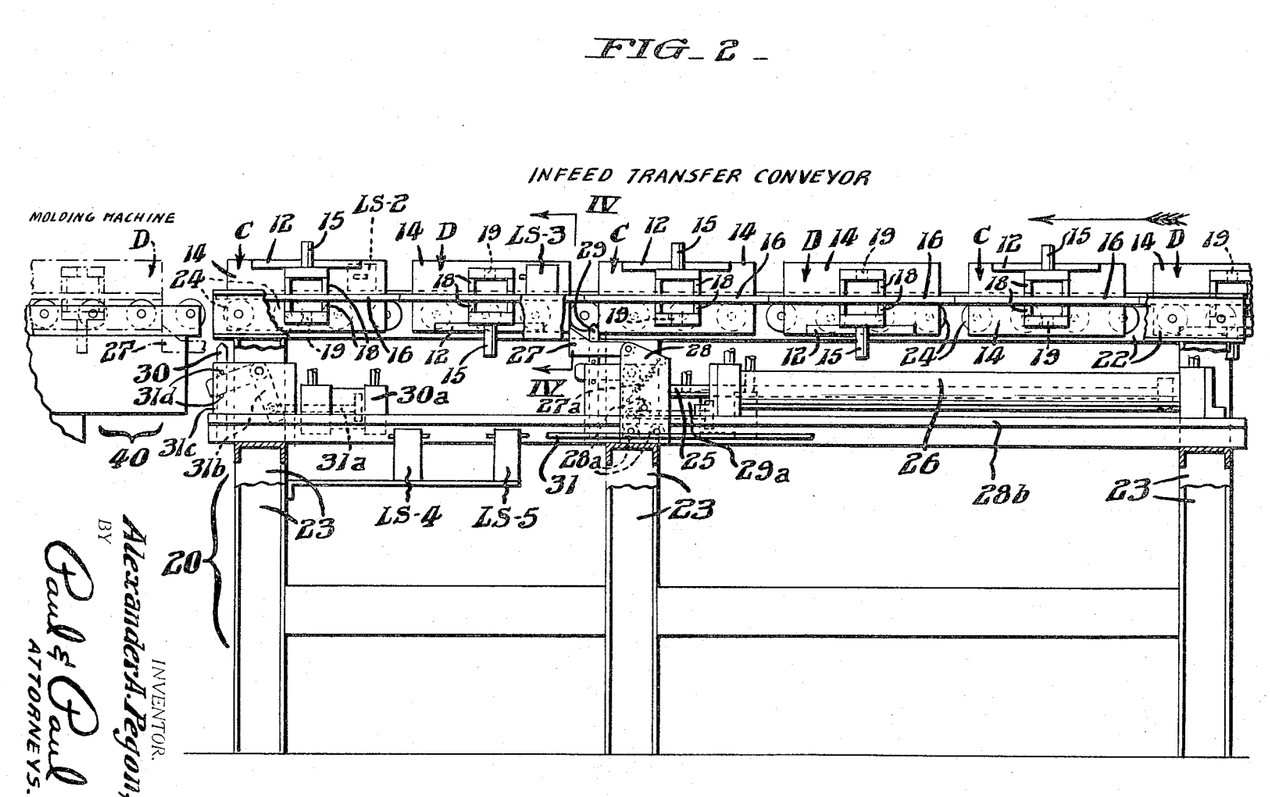
FIG. 2 is a side view, partly broken away, of the preferred form of the infeed transfer conveyor.

Apparatus for automatically and intermittently advancing pairs of cope and drag flasks (FIGS. 2 and 3) comprises a pneumatically operated motor including a cylinder 26 having a piston 25 with a suitable head 28 fitted with a group of rollers 28a, one of which is disposed over, and two of which are disposed under, a guide plate 28b in contact therewith. Pivotally mounted upon the head 28 are a pair of drag pusher members 27 yieldably biased in clockwise direction, as viewed in FIG. 2, by a tension spring 27a secured by one end to the head 28 and by the other end to a tail extension of the members 27. A suitable stop (not shown) limits the clockwise movement of the pusher members 27. The head 28 holds the fore ends of the pushers 27 against the drag (FIG. 2) during the forward stroke but allows the pusher 27 to pivot downwardly against the influence of spring 27a on the withdrawal stroke to clear a pair of flasks newly located at the end of the conveyor. A pair of stops 29, 30 are mounted on the conveyor for vertical reciprocatory movement. The stop 29, when raised, prevents advance of the flasks to the pushers 27, and stop 30, when raised, prevents advance of the cope and drag off the conveyor 20. Pneumatically operated motors 29a, 30a, respectively, control movement of the stops, said motors being controlled by solenoid switches described below. In FIG. 2, stop 29 is in the raised or active position while stop 30 is in the lowered or inactive position. The cylinder of each motor 29a, 30a, accommodates a piston 31a. The fore end of the piston is pivotally connected to one extremity of a bell crank 31b carried by a bracket 31c. The other extremity of the bell crank projects freely between a pair of vertically spaced pins 31d affixed to the stop, as shown.

A pair of contact solenoid switches LS–2 and LS–3 are mounted on opposite sides of the conveyor 20 (FIG. 3) and connected by solenoid valve 300 to the motors 29a, 30a, so that when a cope and drag, respectively, close the switches (FIG. 3), stop 30 is lowered and stop 29 is raised (FIG. 2). The arrangement also is such that when both switches are closed, compressed air is introduced into cylinder 26 through valve 300 to drive the pushers 27 forward and push the cope and drag off the end of the conveyor.

Figure 22:
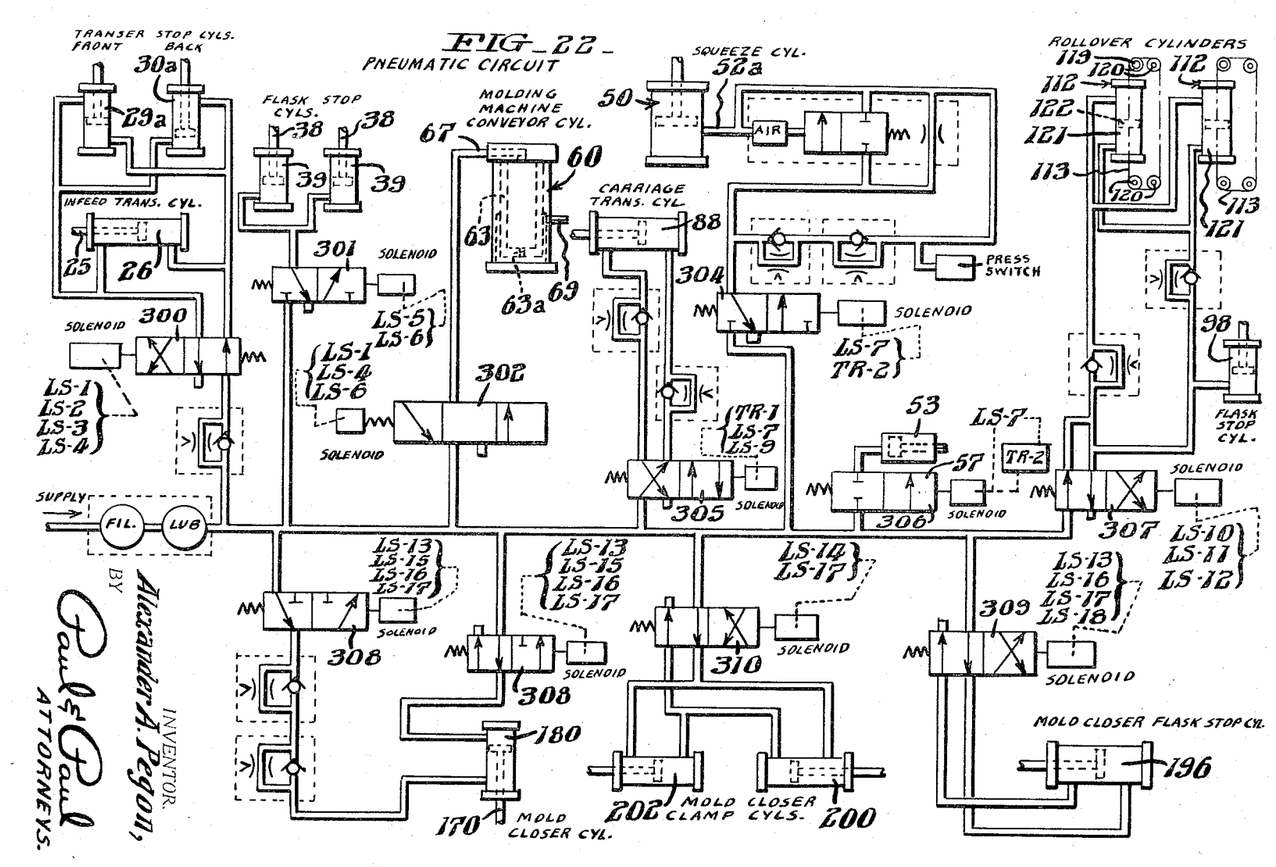
FIG. 22 is a diagrammatic showing of the pneumatic circuit and operating electric switches which control the automatic operation of the apparatus.

A full disclosure of the pneumatic circuit operating the apparatus of this invention is shown in FIG. 22, and a description of how the components operate to form an automatic system is set forth below.

A second pair of solenoid switches LS–4 and LS–5 are mounted in line below the conveyor 20. The switches are actuated by a bar 31 attached to and moving with the head 28. When bar 31 closes switch LS–5, stops 29, 30 are reversed, stop 29 being lowered to allow a second pair of cope and drag flasks to follow to the end of the conveyor 20, and stop 30 being raised to hold the flasks there. When switch LS–4 is closed by bar 31, the pushers 27 are returned to their initial positions (FIG. 3).

Positioned adjacent to the infeed transfer conveyor 20 is the molding machine or station generally designated by the numeral 40. This apparatus operates to receive the empty cope and drag, place the flasks over a pattern plate, fill the flasks with sand or the like, pack or compress the sand about the patterns, separate the flasks from the pattern plate and advance the flasks for further work.

Figure 5:
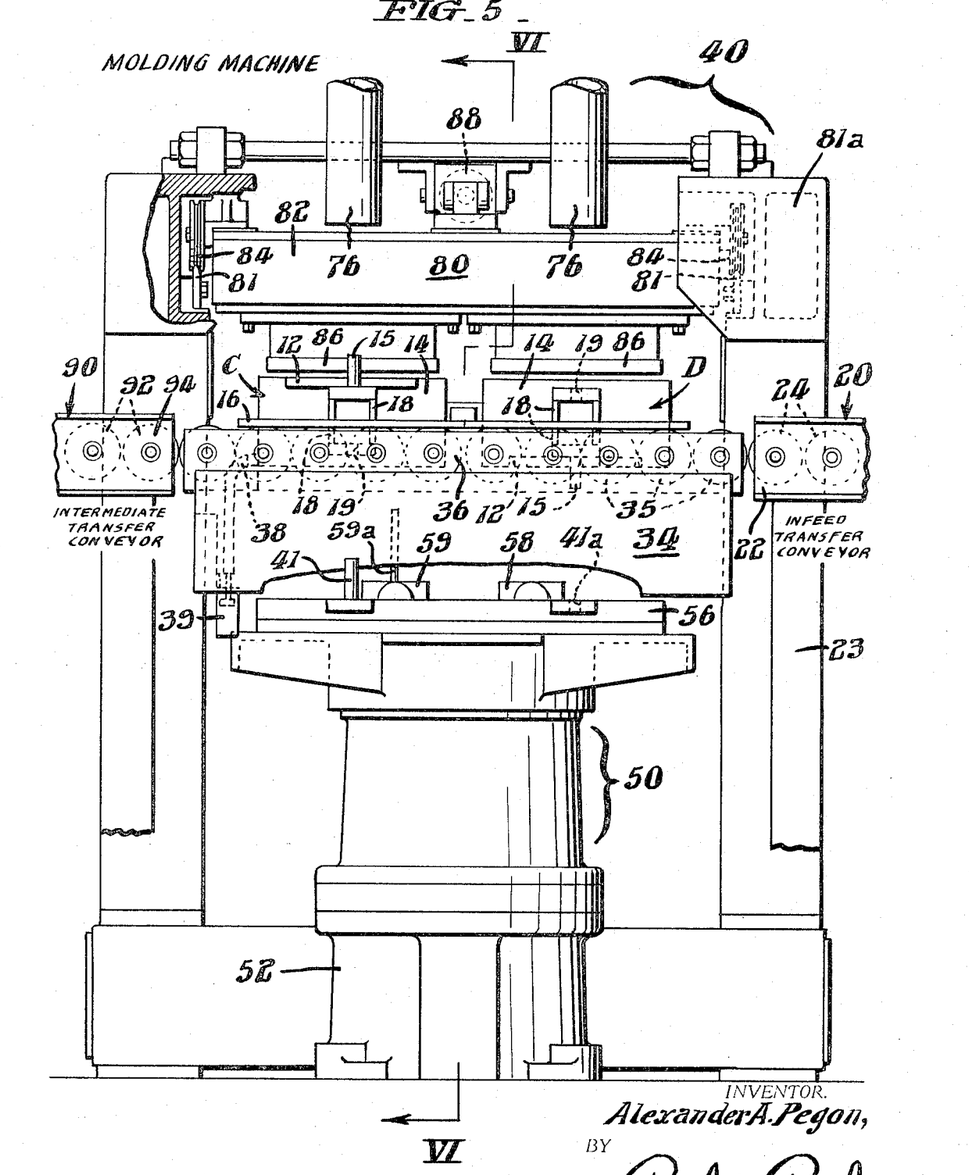
FIG. 5 is a view in side elevation, partly broken away, of the preferred form of the molding machine.
Figure 6:
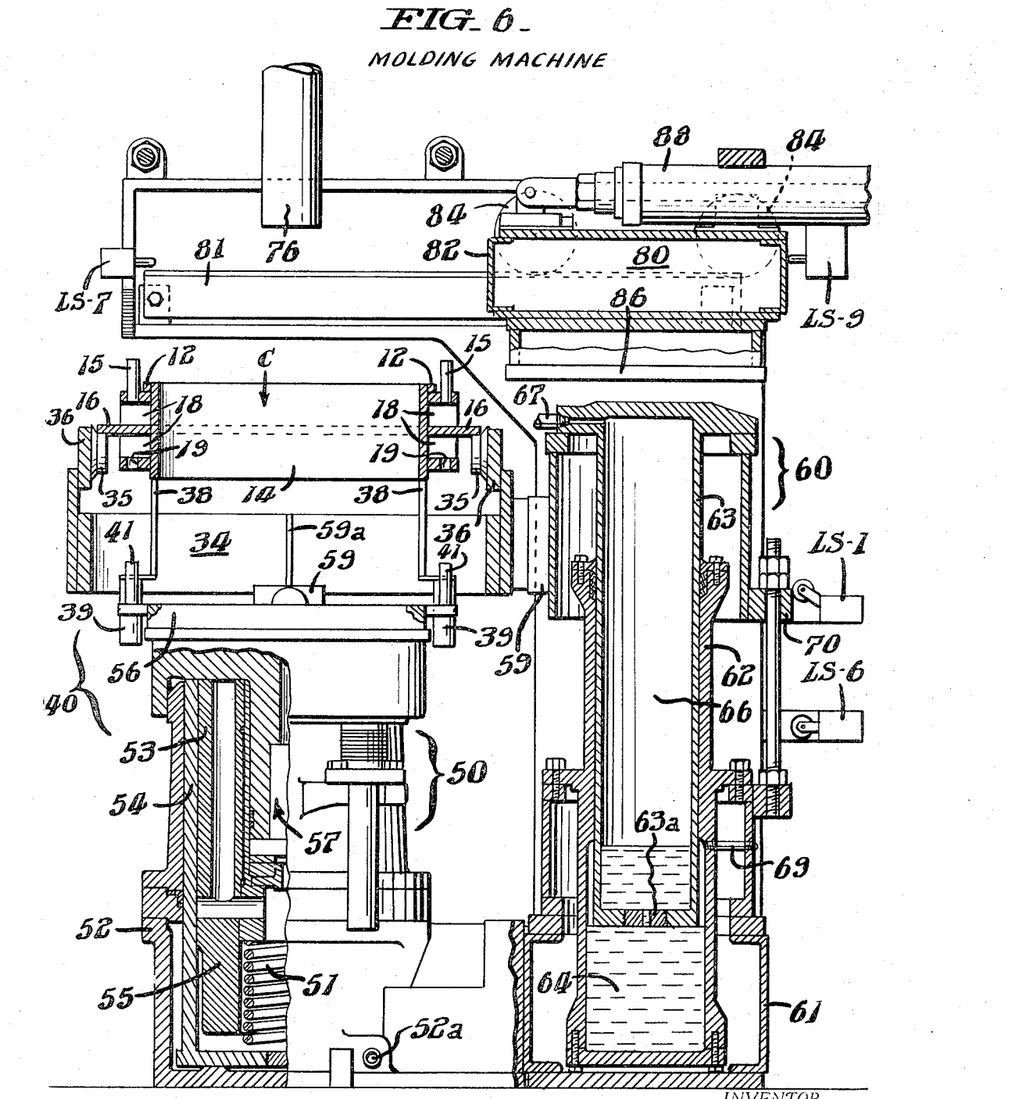
FIG. 6 is a sectional view, partly broken away, taken along the lines and arrows VI—VI of FIG. 5.

The conveyor 20 terminates adjacent vertically movable platform 34 of the apparatus of 40 (FIG. 5) which mounts a series of idler rollers 35 on inwardly-directed surfaces of support rails 36 (FIG. 6). A pair of vertically movable stops 38 controlled by solenoid valve 301 are mounted in air cylinders 39 to position the cope and drag on platform 34 when received from the conveyor 20.

Molding platform 34 is connected by arm 59 (FIG. 6) to a piston assembly, generally designated by the numeral 60, controlled by solenoid valve 302. The piston reciprocates vertically to raise and lower the platform 34 and flasks from the initial top position of FIGS. 5 and 6 to the lower position of FIG. 7. Piston assembly 60 comprises a generally cylindrical base 61 supporting cylinder 62 having a piston 63 mounted therein for reciprocatory movement and supporting platform 34. A supply of oil is held in cylinder reservoir 64 and passes through a port 63a upon a change in air pressure in piston reservoir 66 through line 67. A cylinder bleed valve 69 allows for the bleeding off of small amounts of air captured below the piston 63.

A pair of solenoid switches LS–1, LS–6 are mounted on the frame to be actuated by vertically reciprocating piston block 70. When aforementioned switch LS–4, mounted on conveyor 20, is closed, valve 302 allows the discharge of air from piston reservoir 66 permitting piston 63 and platform 34 to descend to the position shown in FIG. 7.

Located beneath the platform 34 is a jolt-squeeze piston apparatus 50 (FIGS. 6 and 8) which comprise a frame 52 mounting therein a piston structure 54 which in turn supports a pattern plate 56 at its upper end. A pair of matching or half patterns 58, 59 (FIG. 5) are fixedly mounted on the top of plate 56, one pattern having the sprue stem 59a attached to it which subsequently forms the opening through which the molten metal is poured. It should be understood that the two patterns 58, 59 are each half patterns of the whole shape to be ultimately formed and that duplicate patterns can be placed on plate 56 if so desired. The two patterns 58, 59 are positioned on the pattern plate 56 so that each will occupy a corresponding location in the cope or drag flask when the flasks are lowered. The cylinders 39 of the stops 38 are mounted on platform 34. Piston assembly 50 further includes a jolting piston 53 with an anvil 55 at the lower end thereof and a compression spring 51 located therebeneath. A jolting valve 57 controls a flow of compressed air beneath jolting piston 53 and effects jolting which packs the sand around the patterns 58, 59 as described further hereinbelow. Apparatus 50 is shown in retracted position in FIGS. 5, 6 and 7 and is in the raised, operative position in FIG. 8.

Figure 7:
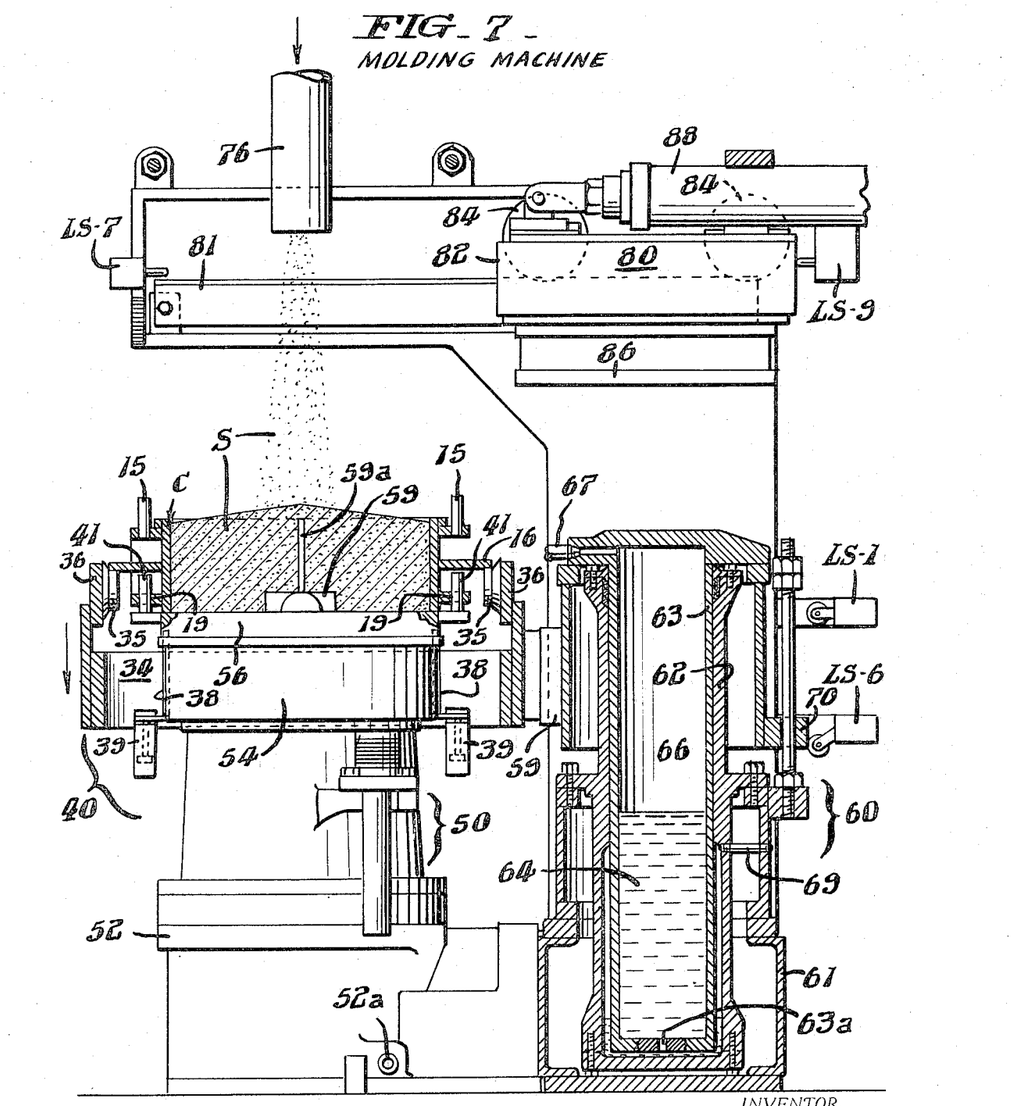
FIG. 7 is a sectional view similar to that of FIG. 6 showing a subsequent step in the mold forming process.
Figure 8:
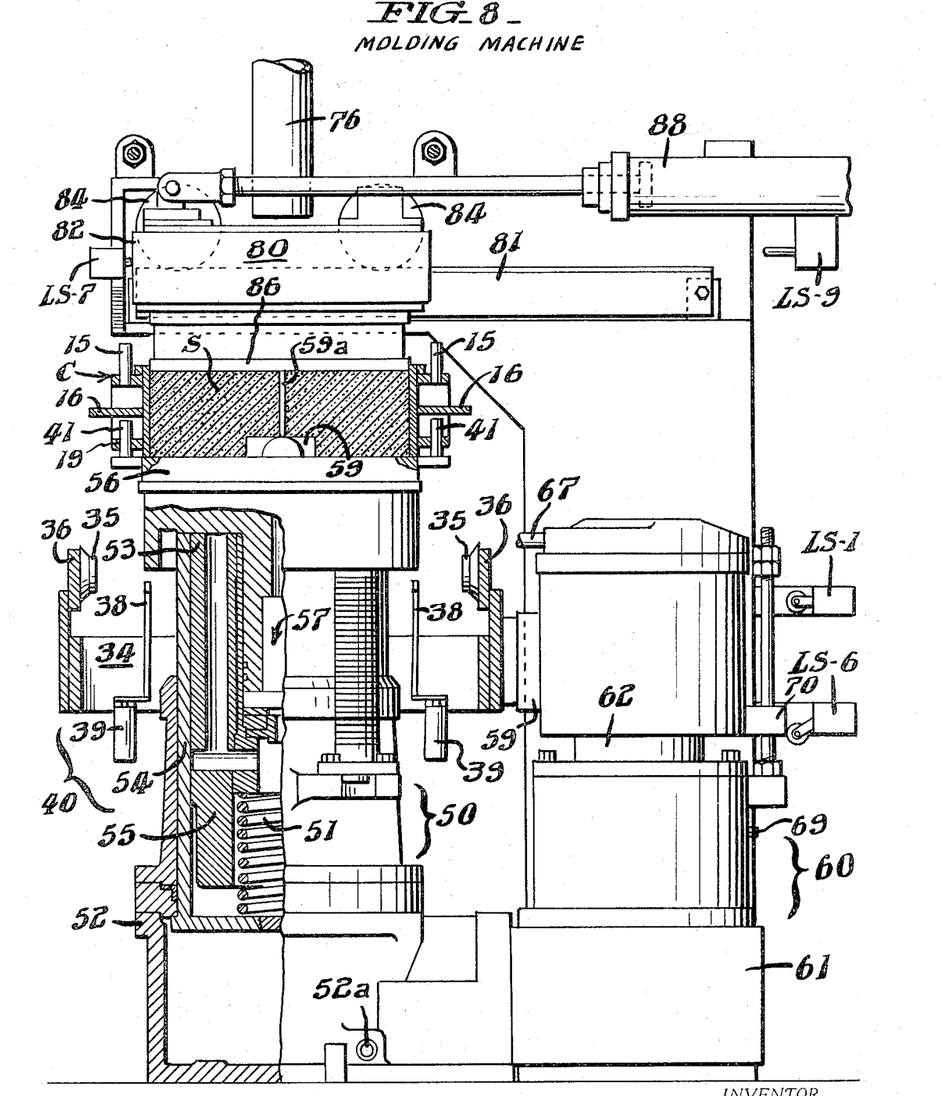
FIG. 8 is a sectional view similar to that of FIG. 7 showing a subsequent step in the mold forming process.

Mounted above the jolt squeeze cylinder apparatus 50 is top squeeze board apparatus 80 having a pair of horizontal rails 81 mounted in a frame 81a. Arranged to travel over the rails 81 are a set of rollers 84 which support member 82. Affixed to the underside of the squeeze member 82 are two squeeze boards 86. The piston of pneumatic motor 88, mounted on frame 81a, is attached to member 82 and moves the member 82 between a location laterally displaced from the pattern plate 56 (FIGS. 6 and 7) to one directly above (FIG. 8). A pair of switches LS–7, LS–9, actuated by the member 82, control the movement of the piston, as described below.

As shown in FIG. 1, finely divided particles are discharged from apparatus 72 which includes a hopper 73, a pair of funnels 75, a pair of discharge chutes 76 and two timer relay activated valves 77. Preferably, sand S is stored in the apparatus and used to form the mold impressions, but other similar materials are suitable as are well known in the trade. The chutes 76 are positioned as shown in FIG. 5 to discharge a pre-determined quantity of sand or the like into each of the two flasks located therebelow while the valves 77 remain open.

Automatic operation of the molding machine 40 disclosed herein is as follows:

A cope and drag are pushed from the infeed conveyor 20 onto platform 34 and stopped in the proper position thereon by stops 38 (FIG. 5). Switch LS–4, closed by the pusher bar 31, causes valve 302 to open and exhaust air from reservoir 66 through line 67. Piston 63 descends by gravity, whereupon oil from reservoir 64 bleeds through port 63a into reservoir 66. Thus the cope and drag are lowered onto pattern plate 56 (FIG. 7). As platform 34 descends, stops 38 retract and aligning studs 41 (FIG. 6) mounted on the sides of plate 56 pass into holes 19 on both ends of the cope flask and pins 15 on the drag flasks enter holes 41a on plate 56 thereby precisely positioning the flasks relative the pattern plate 56 and patterns 58, 59. As piston block 70 descends, it closes switch LS–6 which closes the valve 302 controlling the exhaust of air from piston reservoir 66. Switch LS–6 also activates the time relays (TR–1) controlling valves 77 in the sand dispensing apparatus 72 (FIG. 1) allowing sand S to drop from chutes 76 to fall within the cope and drag disposed therebeneath (FIG. 7). Valves 77 are then closed by the relays TR–1 after filling the flasks.

Timer relays TR–1 also activate the piston of cylinder 88 to roll the top squeeze member 82 from the inactive position shown in FIG. 7 to the active position shown in FIG. 8. Switch LS-7, closed by member 82, stops the further movement of the piston of cylinder 88 and opens solenoid valve 304 which allows a flow of compressed air through inlet 52a to the interior of frame 52. Rising squeeze piston 54 lifts the flasks until the squeeze boards 86 fit within the tops of the flasks and come into contact with the top surface of the sand S as shown in FIG. 8. a second timer relay TR-2 then opens jolting valve 57 which causes the piston 53 to deliver a series of rapid jolts or impacts to the pattern plate 56 thereby further compressing and packing the sand around the patterns 58, 59. After a predetermined number of jolts, relay TR-2 allows the discharge of air from the interior of frame 52 through solenoid valve 304 causing piston 54 to descend to its lower position indicated in FIG. 7. The relay TR-2 also activates the piston of cylinder 88 through solenoid valve 305 to return to its initial position, whereupon switch LS-9 stops the piston and initiates the flow of air into piston reservoir 66. Piston 63 lifts platform 34 to its raised position and block 70 closes switch LS-1 which stops further upward movement of piston 63 and activates the piston of cylinder 26. Pushers 27 advance another pair of cope and drag flasks from conveyor 20 and push the flasks having the impressions therein onto an intermediate transfer conveyor.

An intermediate transfer conveyor, generally designated by the numeral 90 (FIG. 9), receives the cope and drag flasks when they are pushed from the molding station platform 34 by the following two flasks. The conveyor 90 has a series of driven rolls 92 mounted on opposing frame members 94, each roll having a sprocket 92a around which encircles one of a pair of drive chains 93, as shown. Chains 93 are driven in the direction of the arrow by a second drive chain 95 which in turn is driven by an electric motor 97 through a reduction gear box 96.

Figure 9:
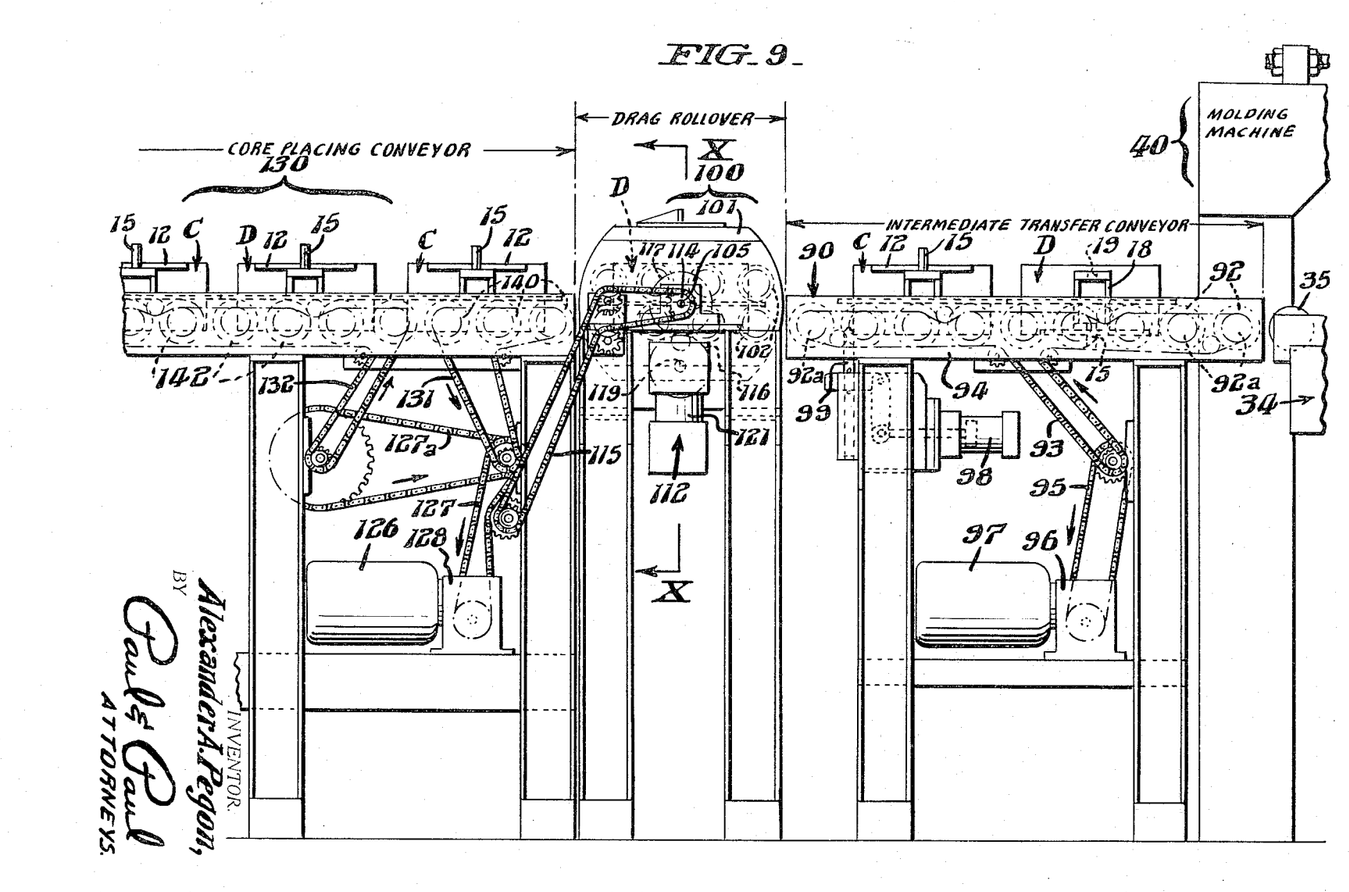
FIG. 9 is a side elevational view, partly cut away, of the preferred forms of the intermediate transfer conveyor, the drag rollover and the core placing conveyor.

A vertically movable stop 99, generally similar to the stops 29 and 30, is located adjacent the top of the conveyor 90 to intermittently allow a pair of flasks to advance in the driven direction or to the left as shown in FIG. 9. A pneumatic motor 98 controls the movement of stop 99.

Figure 10:
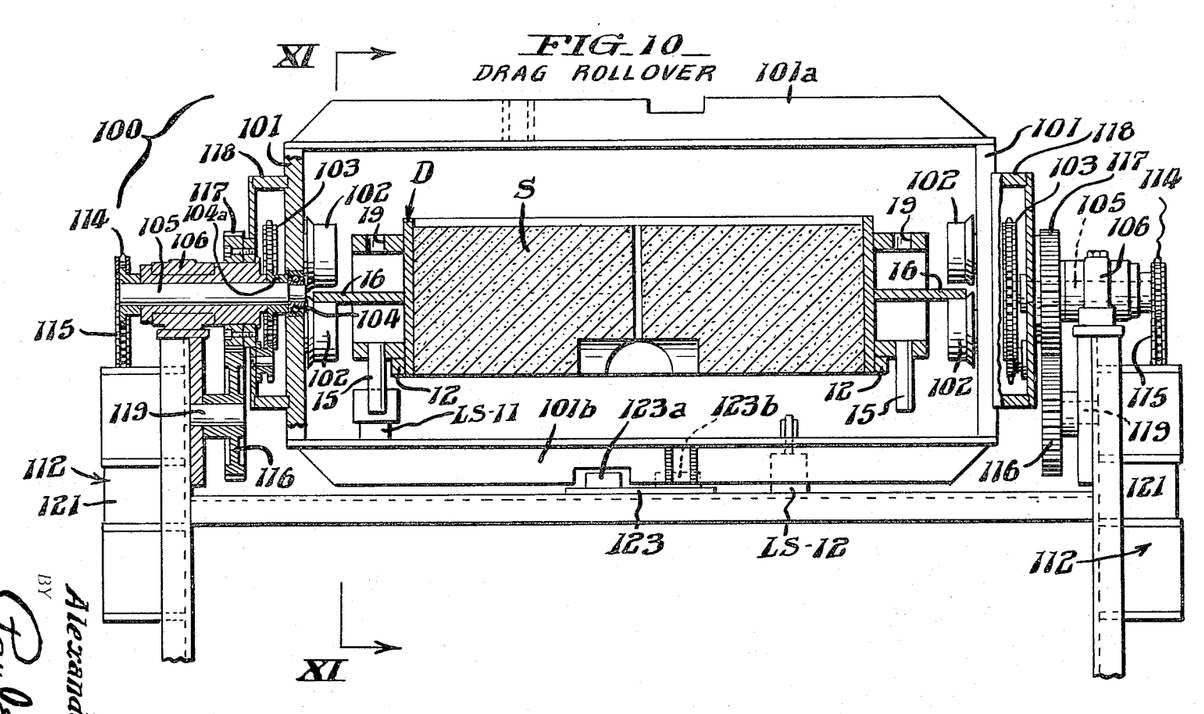
FIG. 10 is a sectional view taken along the lines and arrows X—X of FIG. 9.
Figure 11:
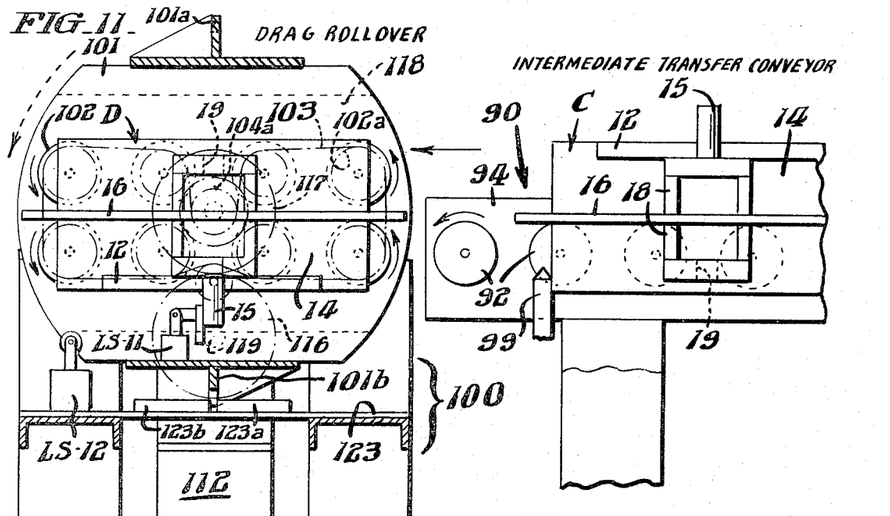
FIG. 11 is a sectional view taken along the lines and arrows XI—XI of FIG. 10 showing the initial position of the apparatus.

Located adjacent the transfer conveyor 90 to receive the flasks therefrom is the drag rollover station designated generally by the numeral 100. The drag rollover 100 comprises generally a rectangular frame 101 (FIG. 10) mounting an upper and a lower set of driven rolls 102 on each side of the frame 101 separated to allow the flanges 16 of the flasks to pass therebetween. On each side of the frame 101 the rolls are driven by a chain 103 which encircles a set of sprockets 102a mounted for turning the rolls (FIG. 11). All the rolls are driven in a counter-clockwise direction, chain 103 being driven by a sprocket 104a affixed to a shaft 105. Shaft 105 is actuated by a sprocket 114, which in turn is driven by a motor 126 operatively connected thereto by means including a chain 115. The frame 101 is mounted by bearings 104 (FIG. 10) on axially aligned shafts 105 which in turn are supported by bearings 106. Frame 101 is caused to rotate first 180° in one direction and then in the other direction by a pair of known rollover activator mechanisms 112 located on opposite sides of the frame. Each of the mechanisms 112 includes a driving chain 113 (FIG. 22) looped over a set of sprockets 120 and connected to the piston 122 of a pneumatic motor 121. One of the sprockets 120 is mounted on a shaft 119 which also mounts a gear 116 which drives a gear 117 operable for causing the arms 118 to rock the frame 101 about shaft 105. The activator 112 is a commercially known apparatus.

Figure 12:
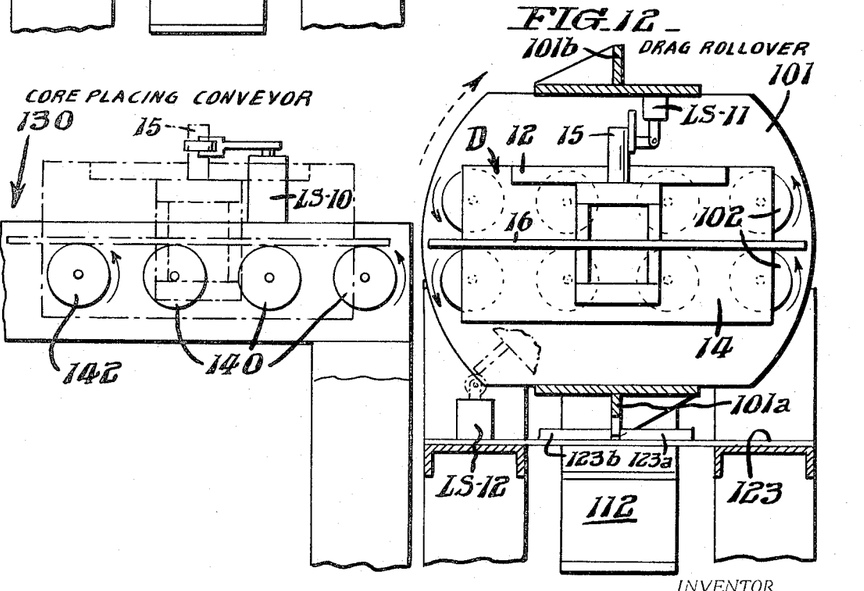
FIG. 12 is a sectional view similar to that of FIG. 11 showing a following position of the apparatus.

Referring now to FIGS. 11 and 12, a cope and drag flask are propelled by the driven rolls 92 from the intermediate transfer conveyor 90 onto the rollover aparatus 100 when stop 99 descends. The flanges of the cope engage the lower driven rollers of the rollover and pass completely through while the rollover remains in the horizontal position so that the cope is discharged onto the core placing conveyor 130 located adjacent thereto. The drag, following the cope on conveyor 90, moves into the rollover and is stopped when one of the downwardly-directed studs 15 encounters stop switch LS-11 in the frame 101 (FIG. 11). Switch LS-11 is connected to activator 112 through solenoid valve 307 and when switch LS-11 closes, the activator turns the frame 101 over with the drag flask therein in a counter-clockwise direction as indicated by the dotted arrow in FIG. 11. As the frame 101 approaches the inverted position, an integral flange 101a, heretofore located on the top of the frame 101, strikes the solenoid switch LS-12 which turns off the activator 112. The frame 101 continues to rotate under no power to the completely inverted position (FIG. 12) wherein stop 123a mounted on cross frame 123 prevents further rotation of frame 101 by engaging flange 101a. As the rollers 102 continue to be driven in the counter-clockwise direction, the inverted drag is run off the rollover onto the core placing conveyor 130 located adjacent thereto. Immediately after the drag has left the drag rollover, upright stud 15 closes switch LS-10 mounted on conveyor 130 (FIG. 12) causing the activator mechanism 112 to reverse and turn frame 101 in the opposite direction as indicated by the broken arrow in FIG. 12 back to its initial position (FIG. 11). Flange 101a again closes switch LS-12 causing mechanism 112 to be inactivated, and the frame continues to rotate until flange 101b comes against stop 123b.

The core placing conveyor 130 is located adjacent the rollover apparatus 100 and includes a first set of driven rolls 140 and a second set 142 adjacent thereto driven at a slightly slower rate. The electric motor 126 drives both drag rollover chains 115 and conveyor roll drive chains 131 and 132 through chains 127 and 127a. The difference in speed of rotation of rolls 140 and 142 ensures the quick removal of the cope and drag from the area of the drag rollover but then delays the advance of the flasks while the cope enters the closer apparatus 160.

Along the core placing conveyor 130, a suitable pattern core can be manually placed within the pattern impression formed in the upwardly-directed surface of the sand in the drag. The core is required to form a molded object which has an internal hollow area such as a bore in a pipe connection.

At this point in the process, the cope and drag flasks are positioned a distance apart on the conveyor 130 with the cope having the pattern impression on its downwardly-directed surface and the drag having the impression on its upwardly-directed surface as shown in FIGS. 19 and 20.

Figure 13:
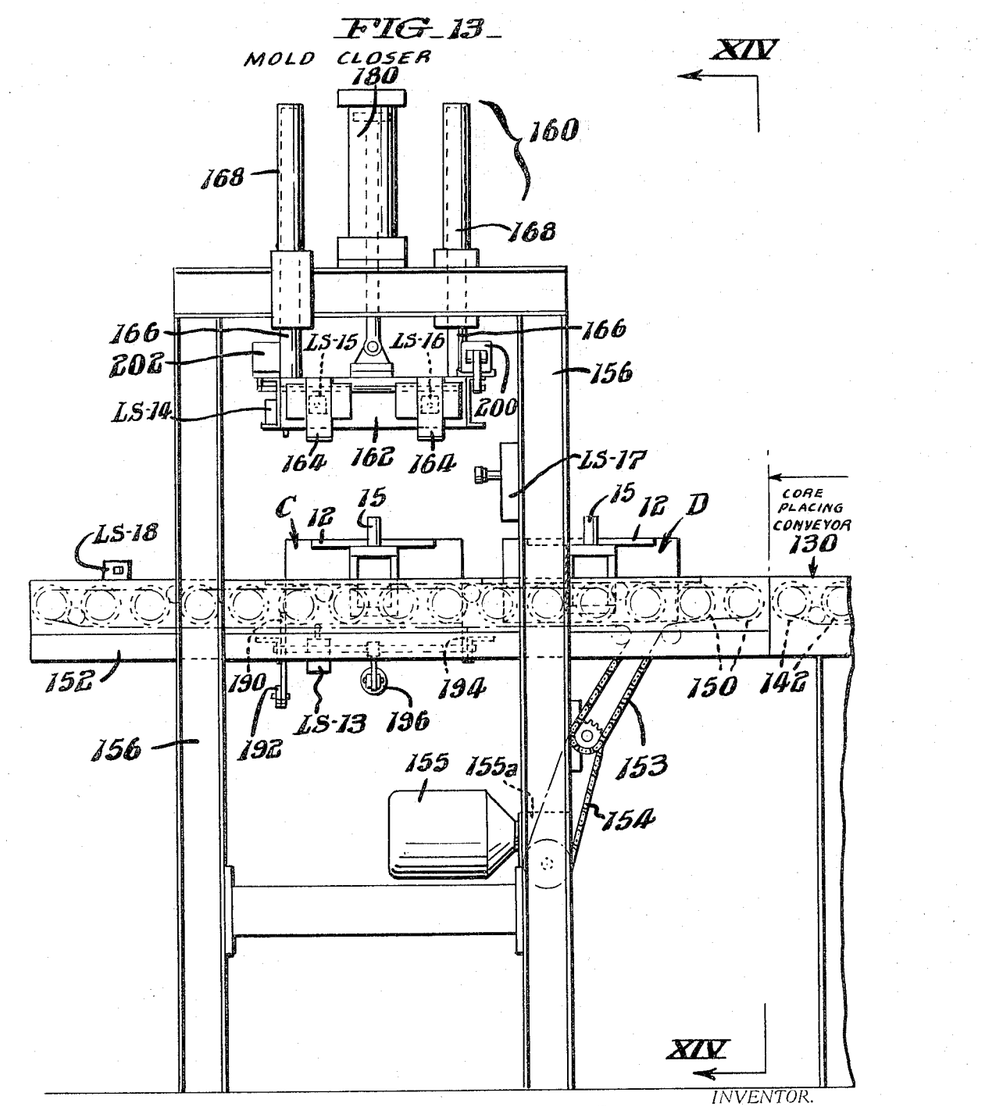
FIG. 13 is a side elevational view of the preferred form of the mold closer.

The preferred form of the mold closer apparatus or station is shown in FIGS. 13 through 16. The apparatus functions to join accurately the half mold impressions in the cope and drag. As shown in FIG. 13, the conveyor rolls 142 carry the alternating cope and drag flasks to another series of driven rolls 150 rotatably mounted on spaced parallel members 152 and driven by a pair of chains 153, chain 154 and motor 155. Supporting the horizontal members 152 are a pair of rectangular upright frames 156 connected across the conveyor by cross members 157 (FIG. 14) to support a cope lifting apparatus 160 thereon. Apparatus 160 comprises a horizontal member 162 having four downwardly-directed clamps 164, two vertically disposed aligning arms 166 moving in guides 168 and a vertically disposed piston 170. Piston 170 operates within cylinder 180 and is attached at its lower end to the member 162 for lifting member 162 vertically when air under pressure is introduced into the bottom of cylinder 180 under control of solenoid valves 308.

Figure 14:
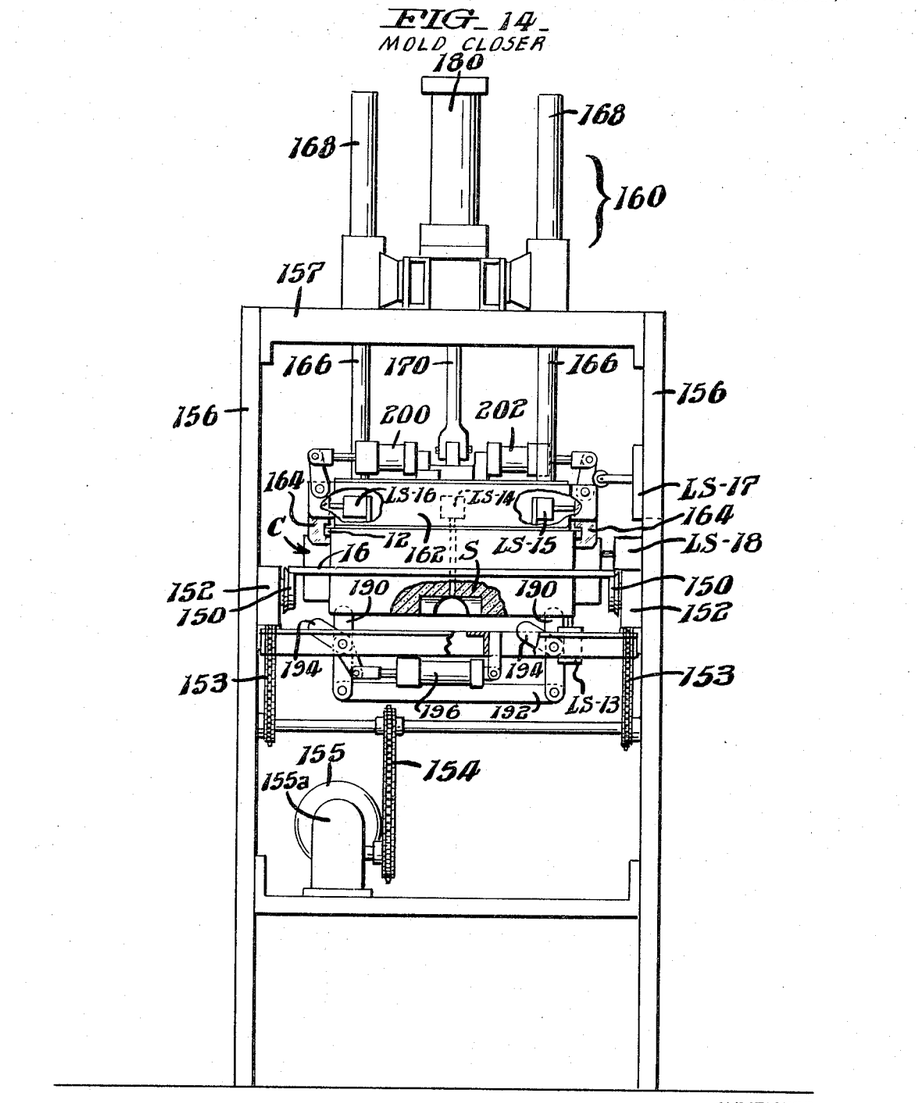
FIG. 14 is a sectional view taken along the lines and arrows XIV—XIV of FIG. 13.
Figure 15:
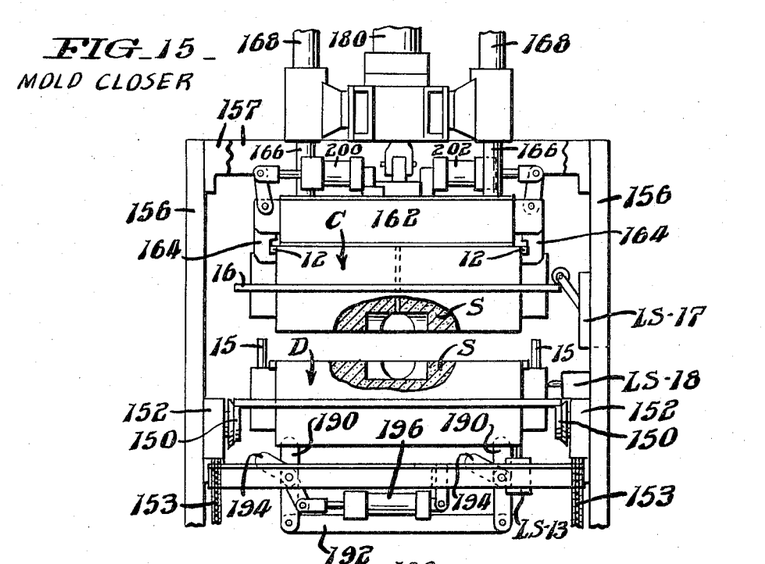
FIGS. 15 and 16 are partial sectional views similar to that of FIG. 14 showing subsequent operations of the apparatus.
Figure 16:
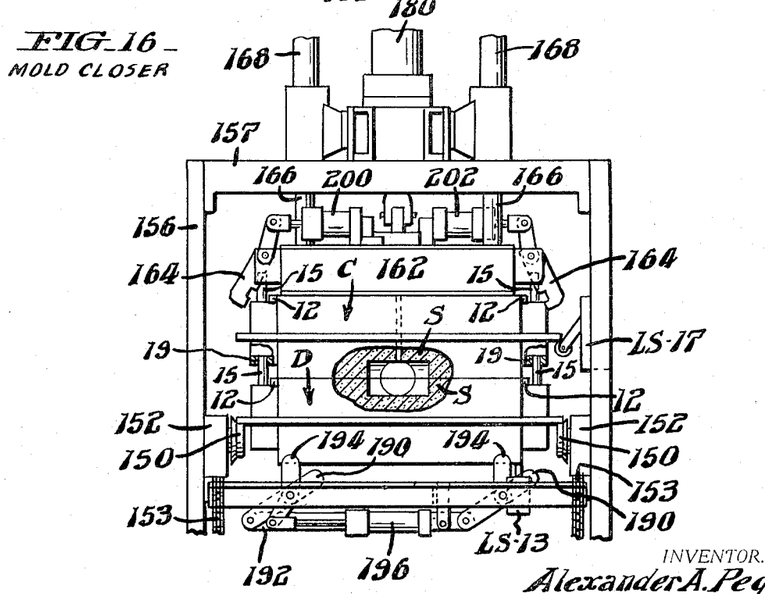

The cope proceeds along the driven rollers 150 until it encounters a pair of vertically aligned, laterally spaced stops 190 which are connected by a rod 192 (FIG. 14). Stops 190 and a second pair of stops 194, located in advance of stops 190, are all controlled by the piston of cylinder 196 mounted beneath the conveyor (FIG. 14) and in turn controlled by solenoid valve 309. Before the cope encounters stops 190, it closes switch LS–13 which causes piston 170 to lower member 162 until switch LS–14, mounted on member 162, closes by reason of contacting the cope (FIG. 14). Switch LS–14 stops the downward movement of piston 170 and activates the pistons of cylinders 200, 202 controlled by solenoid valve 310. The pistons of cylinders 200, 202 close the clamps 164 around end flanges 12 on both ends of the cope. When solenoid switches LS–15, LS–16, operated by the clamps, are closed, the piston 170 is activated to raise the cope from the rollers until cope flange 16 engages switch LS–17, whereupon further upward movement (FIG. 15) is terminated. The following drag proceeds to a position under the raised cope until it encounters raised stops 190 and closes switch LS–13 which again activates the piston 170 to lower member 162 and the cope carried thereby. Member 162 deposits the cope on the drag positioned thereunder by positioning the cope holes 19 to fit over the upright studs 15 of the drag thereby aligning the two flasks (FIG. 16). Switch LS–17 is closed by the descending flange 16 which causes the pistons of cylinders 200, 202 to retract and open the clamps 164. When the clamps are fully opened, switches LS–15, LS–16 are opened, causing the piston 170 to retract and thereby raise the member 162. Flange 16 moves away from switch LS–17 (FIG. 13) which stops the upward movement of member 162 clear of the combined cope and drag. Switch LS–17 also activates the piston of cylinder 196 causing front stops 190 to be pivoted to the lower position and back stops 194 to be raised to the stopping position. Steps 194 thereby hold the following cope and prevent it from entering the mold closer until the combined previous cope and drag are carried down the conveyor. Moving on driven rolls 150, the closed mold (FIG. 21) advances from the closer station along the conveyor to the pouring station (not shown). The combined cope and drag close switch LS–18 mounted adjacent the conveyor beyond the mold closer (FIG. 13) which reverses the piston of cylinder 196 causing stops 190 to be raised and stops 194 to be lowered allowing the following cope and drag to move into the mold closer station.

Automatic operation of the separate components of the apparatus of this invention has been described above. The following description discloses how the apparatus functions as a single unit, accepting flasks at one end and producing closed molds ready for the pouring at the other end.

A series of pairs of alternating cope and drag flasks are placed on the infeed transfer conveyor 20 and advanced to the forward end and whereby the cope closes switch LS–2 and the drag closes switch LS–3. These switches activate the piston 25 of cylinder 26 and the pistons of cylinders 29a, 30a to lower stop 30 and raise stop 29. Pushers 27 push the cope and drag onto the molding machine platform 34 and bar 31 closes switch LS–5 which raises stops 38 on the molding machine and also closes switch LS–4 which reverses the direction of movement of the piston 25.

Switch LS–4 activates the valve 302 allowing a discharge of air from piston reservoir 66 thereby lowering platform 34 until the flasks rest on pattern plate 56. Piston block 70 closes switch LS–6 which operates the timer relays TR–1 activating the solenoid valves 77 to allow a flow of sand from the reservoir 73 through the two conduits 76 into the drag and cope now placed on the pattern plate. After the flasks are filled, relays TR–1 close valves 77 and actuate the piston of top squeeze board cylinder 88 which positions boards 86 directly over the two flasks. When limit switch LS–7 is actuated by the member 82, it stops further movement of the piston of cylinder 88 and actuates the squeeze piston 54 thereby raising the cope, drag and pattern plate to press the sand against the bottom of the squeeze boards 86. A timer relay TR–2 controls the jolting valve 57 to deliver a series of rapid jolts by the piston 53 further compressing the sand around the patterns. Following the jolting, relay TR–2 opens valve 304 to cause piston 54 to descend, again placing the flasks upon the rollers of the platform 34 and activates the piston of cylinder 88 to retract the squeeze boards to the inoperative position. When switch LS–9 is closed by the member 82, compressed air enters the piston reservoir 66 lifting piston 63 and returning platform 34 to the initial level adjacent that of the intermediate transfer conveyor. As switch LS–1 is closed by piston block 70, piston 25 of cylinder 26 pushes two additional flasks onto the molding platform and pushes the flasks having the pattern impression therein onto the driven rolls of the intermediate transfer conveyor.

When stop 99 is lowered, as explained below, the cope is rolled straight through the drag rollover but the drag is stopped therein by stud 15 hitting switch LS–11 which causes the activator 112 to rock the frame 101. Rollover frame 101 rotates into almost the inverted position until switch LS–12 is closed stopping activator 112, at which time frame flange 101a strikes stop 123a. The driven rolls then move the drag out of the drag rollover onto the core placing conveyor where the drag stud closes switch LS–10 which causes the activator to reverse the direction of rotation of the rollover back to the initial position. Switch LS–12 is again closed by flange 101a and the rollover rotates until flange 101b engages stop 123b.

When the cope reaches the mold closer it activates switch LS–13 which causes the member 162 to descend. When switch LS–14 is closed, the pistons of cylinders 200, 202 operate to lock the clamps on the cope. Switches LS–15, LS–16 then cause the piston 170 to raise the cope until switch LS–17 is actuated to stop further upward movement. The following drag advances on driven rolls 150, closes switch LS–13 causing the piston 170 to descend until the aligning studs 15 of the drag fit within the holes 19 in the cope. Switch LS–17 is closed by the descending cope and activates the pistons of cylinders 200, 202 to open the clamps, which open switches LS–15, LS–16 causing the piston 170 to raise the member 162. When switch LS–17 is opened, the piston 170 is inactivated and stops 190, 194 are reversed to allow the combined cope and drag to be advanced along the conveyor to the mold pouring station. When the combined cope and flask close switch LS–18, the stops 190, 194 are reversed, lowering stop 194 and raising stop 190 to allow a new cope to enter the apparatus and initiate a new cycle.

It will be readily apparent to those skilled in the art that improvements and modifications can be made in the preferred form of the apparatus and process disclosed hereinabove. For instance, the switches, solenoids and timer relays can be otherwise constructed and arranged to control movement of the apparatus. In addition, to suit particular requirements for space and size of molds required, the arrangement of the conveyor and stations can be altered for convenience. However, all such changes will be within the spirit and scope of this invention as defined by the claims.

I claim:

1. In a method of automatically and continuously producing foundry molds, the steps comprising moving cope and drag flasks along a straight line and predetermined level into a first station in successive pairs with the cope flask of each pair right side up and the drag flask of each pair wrong side up and trailing the cope flask, loading said flasks with comminute material and packing the same about patterns whereby to form bodies bearing the desired pattern impressions, discharging the loaded flasks from said first station at said level and moving them along said straight line at said level into a second station, discharging said flasks from said second station right side up and at said level and moving them right side up along said straight line and at said level into a third station, raising the cope flask above said level, moving the drag flask along said straight line and at said level to a position directly under said cope flask, lowering said cope flask upon said drag flask to assemble the flasks, and discharging the assembled flasks from said third station along said straight line and at said level.

2. Apparatus for continuously producing closed molds ready for pouring comprising
- a conveyor for successively advancing pairs of cope and drag flasks to and from three stations including
- a molding station having a single molding machine with a single pattern plate, means for lowering a pair of said flasks onto the pattern plate so that the pattern plate with the cope and drag thereon form a pair of receptacles each having four sides and a bottom for receiving therein finely divided particles, means for simultaneously introducing finely divided particles into the cope and drag over pattern halves on said pattern board, and means for simultaneously compacting the particles around the pattern halves so as to form a pair of half pattern impressions in the undersurfaces of the molds,
- a drag rollover station having means for receiving the cope and drag from the molding station and inverting the drag so that the drag half pattern impression faces downwardly, and
- a mold closing station having means for receiving the cope and drag from the rollover station, lifting the cope while the drag advances to a location therebeneath and then lowering the cope on the drag thereby forming the closed mold.

3. The apparatus according to claim 2 wherein the molding station further includes
- a pair of squeeze plates mounted for reciprocatory movement together in a horizontal direction between a location directly above the pattern plate to one laterally disposed therefrom, and means for causing the pattern plate when the squeeze plates are located thereabove so that the finely divided particles within the cope and drag are pressed against the squeeze plates and thereby compacted around the pattern halves, and wherein the rollover station further includes
- means for allowing the cope to move therethrough uninterruptedly, and means for stopping the drag before it is inverted and then propelling the inverted drag onto the adjacent conveyor in the same direction of horizontal movement.

4. The apparatus according to claim 2 wherein the conveyor includes
- an infeed transfer section having means for intermittently pushing pairs of copes and drags into the molding station,
- an intermediate transfer section having driven rolls for advancing a cope and drag from the molding station to the drag rollover station,
- a core placing section having rolls driven at two rates of speed, the rolls adjacent the rollover being driven at a faster rate than those more distant therefrom so that the cope and drag are quickly advanced from the rollover station but then advanced to the mold closing station at a slower rate, and
- a final section for advancing the closed molds from the mold closing section to a pouring section.

5. The apparatus according to claim 3 wherein the mold closing station further includes.
- a cope lifting device mounted for vertical reciprocatory movement including a plurality of downwardly directed clamps for detachably engaging the cope, and means for lowering the lifting device to clampingly engage the cope and to then lift the cope to a predetermined height, and for lowering the lifting device and the cope held thereby when a drag is located therebeneath to place the cope on top of the drag.

6. A process for continuously producing closed molds ready for pouring comprising the steps of
- receiving a cope and drag upon a platform,
- lowering the platform so that the cope and drag come to rest simultaneously upon a single pattern plate having two complementary pattern halves fixedly mounted thereon, the pattern halves being thereby located within the cope and drag,
- introducing finely divided particles into the cope and drag and around the pattern halves,
- raising the pattern plate so as to compact the particles against a pair of members positioned vertically above the cope and drag thereby forming matching pattern half impressions in the undersurfaces of the molds,
- inverting the drag so that the drag pattern half impression faces upwardly, and
- lifting the cope to a higher level, advancing the drag at the initial level to a position therebeneath, and lowering the cope on the drag to form a closed mold.

7. The process according to claim 6 further including the step of
- simultaneously moving horizontally a pair of squeeze boards from a position laterally displaced to a position directly above the cope and drag following the introduction of finely divided particles into the cope and drag.

8. The process according to claim 7 further including the step of
- simultaneously moving horizontally the pair of squeeze boards from a position directly above the cope and drag flasks to one laterally displaced therefrom after compaction of the finely divided particles in the cope and drag.

References Cited by the Examiner

UNITED STATES PATENTS

| | | | |
|---|---|---|---|
| 2,612,668 | 10/1952 | Hutchison | 22—20 |
| 2,960,735 | 11/1960 | Whitesell | 22—20 |
| 3,123,871 | 3/1964 | Taccone | 22—20 |
| 3,181,207 | 5/1965 | Schaible et al. | 22—20 |

J. SPENCER OVERHOLSER, *Primary Examiner.*

E. MAR, *Assistant Examiner.*